(12) United States Patent
Koyama

(10) Patent No.: US 8,752,909 B2
(45) Date of Patent: Jun. 17, 2014

(54) BRAKE MECHANISM, TRANSPORT APPARATUS AND INDUSTRIAL APPARATUS

(75) Inventor: Mitsuaki Koyama, Sayama (JP)

(73) Assignee: Nihon Dempa Kogyo Co., Ltd., Tokyo (JP)

(*) Notice: Subject to any disclaimer, the term of this patent is extended or adjusted under 35 U.S.C. 154(b) by 184 days.

(21) Appl. No.: 13/135,135

(22) Filed: Jun. 27, 2011

(65) Prior Publication Data
US 2012/0012428 A1    Jan. 19, 2012

(30) Foreign Application Priority Data

Jul. 13, 2010    (JP) .................................. 2010-158938
Mar. 31, 2011   (JP) .................................. 2011-080004

(51) Int. Cl.
*B60T 13/02*    (2006.01)

(52) U.S. Cl.
USPC ............ 303/20; 188/72.8; 188/72.3; 303/155

(58) Field of Classification Search
None
See application file for complete search history.

(56) References Cited

U.S. PATENT DOCUMENTS

| | | | | |
|---|---|---|---|---|
| 3,614,488 | A * | 10/1971 | Sonderegger et al. | 310/333 |
| 4,944,372 | A * | 7/1990 | Taig | 188/156 |
| 5,090,518 | A * | 2/1992 | Schenk et al. | 188/72.1 |
| 6,626,271 | B1 * | 9/2003 | Bohm et al. | 188/158 |
| 6,742,632 | B2 * | 6/2004 | Treyde | 188/73.35 |
| 6,748,310 | B2 * | 6/2004 | Tamasho et al. | 701/70 |
| 7,117,748 | B2 * | 10/2006 | Baumann et al. | 73/779 |
| 7,232,013 | B2 * | 6/2007 | Thrush | 188/1.11 L |
| 8,297,133 | B2 | 10/2012 | Schmitt-Walter et al. | |
| 2002/0027387 | A1 * | 3/2002 | Kubota | 303/20 |
| 2004/0163900 | A1 * | 8/2004 | Beuerle et al. | 188/72.1 |
| 2006/0158068 | A1 * | 7/2006 | Shimizu et al. | 310/358 |
| 2010/0011884 | A1 | 1/2010 | Schmitt-Walter et al. | |
| 2011/0133601 | A1 * | 6/2011 | Zeches et al. | 310/313 R |

FOREIGN PATENT DOCUMENTS

| | | |
|---|---|---|
| CN | 1043476 | 7/1990 |
| JP | 2000-062591 | 2/2000 |
| JP | 2001-349816 | 12/2001 |
| JP | 2008-544262 | 12/2008 |

* cited by examiner

*Primary Examiner* — Thomas Irvin
(74) *Attorney, Agent, or Firm* — Jordan and Hamburg LLP

(57) ABSTRACT

A brake mechanism is constituted to have: an electromotive actuator which suppresses a rotation of a disk by moving a first pad toward a second pad to sandwich and press the disk between the first pad and the second pad; a pressing force setting section outputting a set signal to set a pressing force of the pad to the disk; a plurality of piezoelectric elements provided at different places from each other in the first pad or the second pad, the plurality of piezoelectric elements detecting a stress of the pad; a signal processing part which processes electric signals obtained from the plurality of piezoelectric elements and generates a detection signal of a pressing force, the detection signal corresponding to a pressing force of the pad to the disk; and a computing part which obtains a deviation between the set signal and the detection signal, computes an operation signal of the electromotive actuator based on the deviation, and then outputs the operation signal.

15 Claims, 9 Drawing Sheets

(a)

(b)

BRAKE MECHANISM, TRANSPORT APPARATUS AND INDUSTRIAL APPARATUS

BACKGROUND OF THE INVENTION

1. Field of the Invention

The present invention relates to a brake mechanism which includes a piezoelectric element, and to a transport apparatus and industrial apparatus which include the brake mechanism.

2. Description of the Related Art

As a braking device for a conventional vehicle such as an automobile driven by gas, a disk brake has been used, for example. As such a disk brake, pads to be a pair to each other are disposed on both surfaces of a disk which is connected to a tire and rotates along with the tire. When a driver depresses a brake pedal installed at a driver seat, one pad moves toward the other pad by an oil pressure mechanism, for example, and the disk is sandwiched by the pads. Then, a friction force between the pad and the disk decreases a rotation speed of the disk, eventually bringing a rotation of the disk to a halt. A rotation of the tire is also halted by the halt of the rotation of the disk.

In recent years, in order to protect environment, an electric vehicle which has an engine driven by electricity instead of gas has been developed. In order to simplify a structure of the electric vehicle, it is examined to provide a motor instead of providing the oil pressure mechanism thereby to operate the pad by the motor.

Meanwhile, in such an electric vehicle, for safer and comfortable driving, it is examined to make a depressing angle of a brake pedal of the vehicle and a deceleration of a tire correspond closely. For such a purpose, it is required to make the depressing angle of the brake pedal and a pressing force of the pad by the motor corresponded to each other, but adjusting the pressing force with high accuracy by the motor is difficult. Thus, it is examined to provide a piezoelectric element in a rear surface (surface opposite to a pressing surface of the disk) of the pad. More specifically, it is examined to detect a pressure change of a pressure detecting region of the rear surface of the pad by the piezoelectric element and to control an operation of the motor based on a detection result.

However, when the disk is pressed, in some cases, a pressure in a certain point of the pad becomes temporarily large or small compared with a pressure in another point, due to minute irregularities of the pressing surface of the pad and each surface of the disk, for example. Since a variation of the pressure becomes sometimes large as described above, stable control cannot be always done. Though a disk brake of the electric vehicle has been explained here, in a device using a brake mechanism which controls a rotation speed of a disk by pressing the disk as above it is required that braking is performed with high accuracy in correspondence with a user's operation, similarly to in the disk brake.

Patent Document 1 describes, with regard to a pressure sensor constituted by a crystal, a structure in which a plurality of electrodes are formed in one side of a crystal piece, but cannot solve the above-described problem.

(Patent Document)

Japanese Patent Application Laid-open No. 2001-349816

SUMMARY OF THE INVENTION

The present invention is made in order to solve the above-described problem and its object is to provide a technique capable of controlling a deceleration of a disk with high accuracy.

A brake mechanism of the present invention has:

a disk which rotates;

a first pad provided in one surface side of the disk in a manner to face the disk;

a second pad provided in the other surface side of the disk in a manner to face the first pad across the disk;

an electromotive actuator which suppresses a rotation of the disk by moving the first pad toward the second pad to sandwich and press the disk between the first pad and the second pad;

a pressing force setting section outputting a set signal to set a pressing force of the pad to the disk;

a plurality of piezoelectric elements provided at different places from each other in the first pad or the second pad, the plurality of piezoelectric elements detecting a stress of the pad;

a signal processing part which processes electric signals obtained from the plurality of piezoelectric elements and generates a detection signal of the pressing force, the detection signal corresponding to the pressing force of the pad to the disk; and a computing part which obtains a deviation between the set signal and the detection signal, computes an operation signal of the electromotive actuator based on the deviation, and then outputs the operation signal.

A concrete aspect of the present invention is as follows, for example.

(a) The signal processing part creates the detection signal based on a maximum value, a minimum value, or an average value of the electric signals obtained from the plurality of piezoelectric elements.

(b) The plurality of piezoelectric elements share a piezoelectric piece.

(c) The piezoelectric element is constituted by a crystal piece.

(d) The electromotive actuator has a motor and a converting member to convert a torque of the motor into a linear movement for moving the first pad, and the operation signal is outputted to the motor.

(e) The disk is interlocked to rotate with a wheel of a running vehicle.

Further, a transport apparatus and an industrial apparatus of the present invention each have the above-described brake mechanism.

According to the present invention, piezoelectric elements are provided in a plurality of places different from each other in a pad, a stress of the pad in each place is detected, each detection signal is processed, and a signal after processing is used as a feedback signal, and thus an influence of the stress which is locally lopsided can be made small and a deceleration of a disk can be controlled with high accuracy.

DETAILED DESCRIPTION OF THE PREFERRED EMBODIMENT(S)

Figure 1:
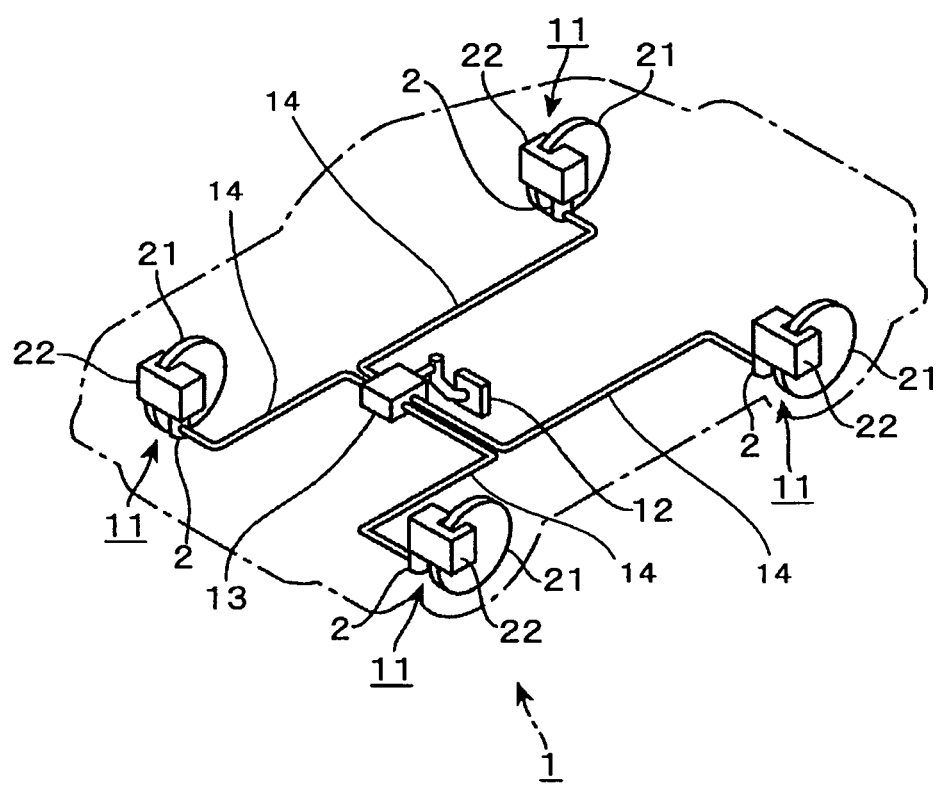
FIG. 1 is a perspective view of an automobile according to an embodiment of the present invention.

FIG. 1 is a schematic perspective view of an automobile 1 being a vehicle according to the present invention. In the automobile 1, a disk brake 11 is provided for each tire. A reference number 12 in the drawing indicates a brake pedal provided at a driver seat of the automobile 1. The brake pedal 12 is connected to a set signal output part 13 which constitutes a pressing force setting section. When a driver steps on the brake pedal 12, a set signal V0 of a level corresponding to a level of an angle of the brake pedal 12 is outputted from the set signal output part 13. This set signal V0 is a signal for setting a pressure force of friction pads 31, 32 to a disk 21 which will be described later. A reference number 14 in the drawing indicates a cable connecting the set signal output part 13 and a motor 2 of each disk brake 11.

The disk brake 11 includes a standing circular disk 21. Though illustration is omitted, in the outside of the disk 21, a tire of the automobile 1 is connected in parallel with the disk 21, and the disk 21 and the tire are interlocked to rotate.

Figure 2:
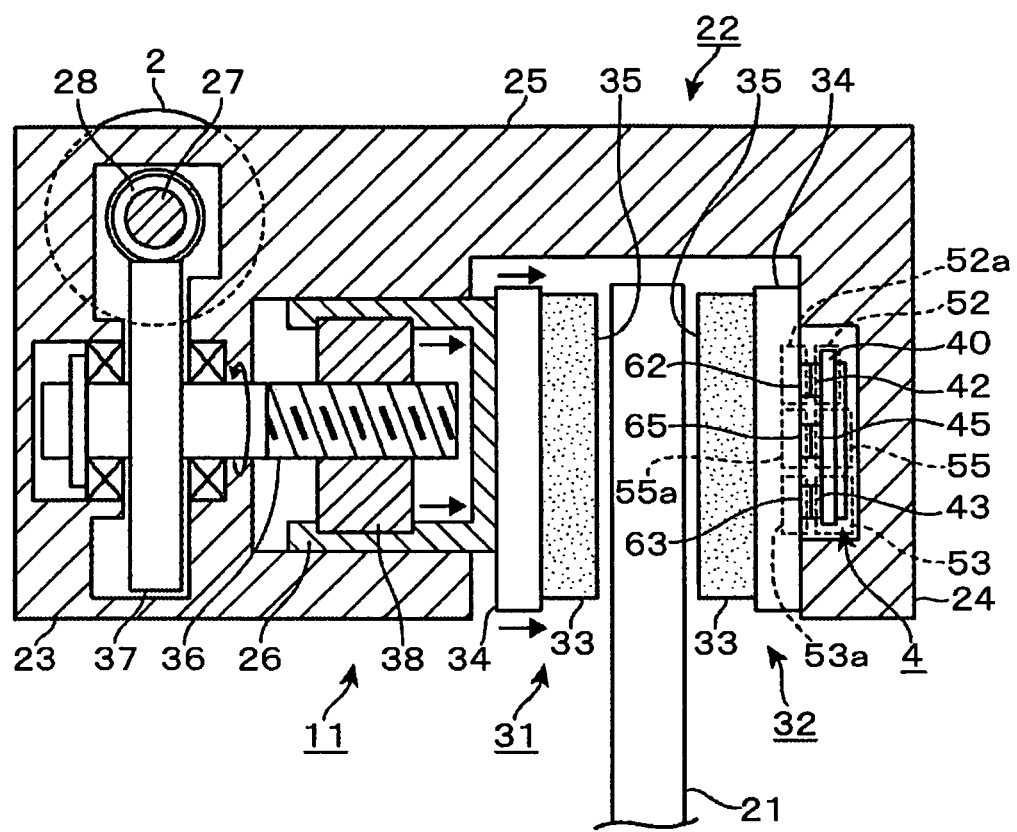
FIG. 2 is a transverse sectional view of a disk brake.

Explanation is continued also with reference to FIG. 2. A caliper 22 which is formed to be schematically U-shaped is disposed in a manner to be laid across both sides of the disk 21. The caliper 22 has leg portions 23, 24 provided inside and outside of the automobile 1 when viewed from the disk 21, respectively, and a bridge portion 25 which connects the leg portions 23, 24. Between the leg portions 23, 24 and the disk 21, there are provided plate-shaped friction pads 31, 32 which face the disk 21. The friction pad 31 is fixed to a piston 26 provided in the leg portion 23, while the friction pad 32 is fixed to the leg portion 24. The friction pads 31, 32 are constituted by pad main bodies 33 and supporting members 34, and pressing surfaces 35 of the pad main bodies 33 face the disk 21.

A rotation shaft 36 extending in a thickness direction of the disk 21 is provided in the leg portion 23, and a screw is cut in an outer circumference of the rotation shaft 36. A nut 38 is provided in the aforementioned piston 26 in a manner to be fixed to the piston 26, and a screw which fits the screw of the aforementioned rotation shaft 36 is cut in an inner circumference of the nut 38. A rotation of the rotation shaft 36 enables the piston 26 to make the friction pad 31 move forward and backward in the thickness direction of the disk 21. Further, a worm wheel 37 is connected to the rotation shaft 36.

The aforementioned motor 2 which constitutes an electromotive actuator is provided in the caliper 22, and a worm gear 28 is provided in a motor rotation shaft 27 of the motor 2. As will be described later, when an operation signal Vc computed based on the aforementioned set signal V0 is inputted to the motor 2, the motor 2 drives at a torque corresponding to the operation signal Vc and a feed back signal, and the worm gear 28 rotates. Thereby, the rotation shaft 36 rotates via the worm wheel 37, and the friction pad 31 moves forward and backward in relation to the disk 21. When the friction pad 31 moves toward the disk 21, the disk 21 is sandwiched by the friction pads 31, 32, thereby to be pressed by a pressing force corresponding to the torque of the motor 2. Then, a rotation of the disk 21 is decelerated due to a friction force between the disk 21 and the friction pads 31, 32, and eventually halted.

A piezoelectric element 4 is provided in a surface (rear surface) in a leg portion 24 side of the friction pad 32. A front surface and rear surface of the piezoelectric element 4 are illustrated in FIG. 3(a) and FIG. 3(b), respectively. The piezoelectric element 4 is constituted by an X-cut circular crystal piece 40. It should be noted that as the crystal piece 40, it suffices if one which generates a comparatively large electric charge for a pressure applied to the crystal piece 40 is used, and an STBC-cut crystal piece other the X-cut one can be also effectively used.

In a front surface of the crystal piece 40, an electrode 41 is provided in a center portion. Electrodes 42 to 45 are provided around the electrode 41. In a rear surface of the crystal piece 40, a common electrode 46 is provided to face the electrodes 41 to 45, and the common electrode 46 is grounded. In the piezoelectric element 4, a region of the center portion of the crystal piece 40 and regions made by dividing a peripheral edge portion into four in a circumferential direction, in regions the respective electrodes 41 to 45 being provided, are referred to as regions 51 to 55, respectively.

Figure 4:
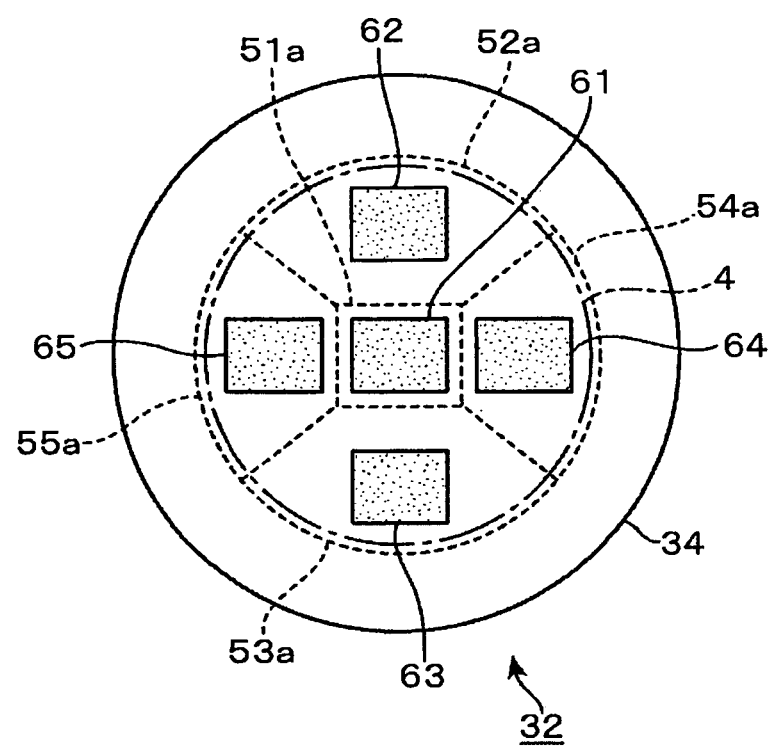
FIG. 4 is a plan view of a supporting member in which the pressure sensor is provided.

FIG. 4 illustrates a rear surface of the supporting member 34 in the friction pad 32. In the aforementioned friction pad 32, respective regions 51a to 55a to overlap the respective regions 51 to 55 of the crystal piece 40 are referred to as pressure detecting regions. Electrodes 61 to 65 for retrieving signals from the electrodes 41 to 45 are provided in the respective pressure detecting regions 51a to 55a. The electrodes 61 to 65 are provided to overlap the electrodes 41 to 45 of the crystal piece 40.

Stresses are applied to the respective regions 51 to 55 of the crystal piece 40 in correspondence with stresses which the pressure detecting regions 51a to 55a of the friction pad 32 receive. A piezoelectric effect of the crystal generates electric charges in correspondence with the stresses applied to the respective regions 51 to 55 of the crystal piece 40, and signals of levels corresponding to amounts of these electric charges are outputted from the electrodes 41 to 45. In other words, though only one piezoelectric element 4 is provided in this example, it can be regarded that piezoelectric elements are individually provided in the respective pressure detecting regions 51a to 55a in practice, the respective piezoelectric elements sharing the crystal piece.

Figure 5:
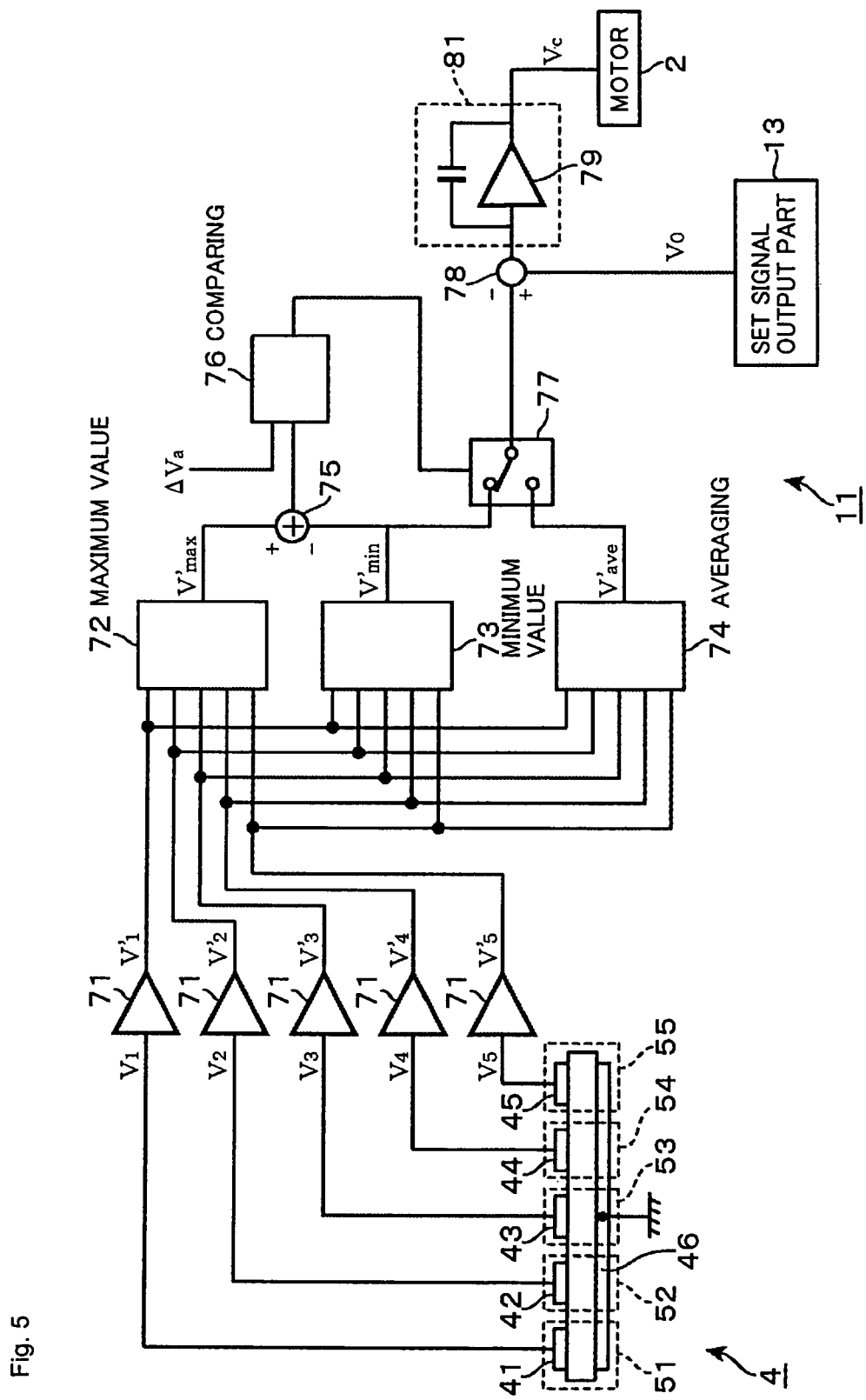
FIG. 5 is a constitutional diagram of a disk brake.

FIG. 5 is a circuit configuration diagram of the disk brake 11. In FIG. 5, for convenience' sake of illustration, the respective electrodes 41 to 45 of the piezoelectric element 4 and the regions 51 to 55 of the crystal piece 40 are illustrated in a developed manner on a page. The respective electrodes 41 to 45 are connected to amplifiers 71, and outputs V1 to V5 from the respective electrodes 41 to 45 are amplified at a predetermined amplification factor. The amplified output signals are referred to as V'1 to V'5. A maximum value detecting part 72, a minimum value detecting part 73, and an averaging part 74 are each connected to subsequent stages of the respective amplifiers 71.

The maximum value detecting part 72 detects a signal (referred to as V'max) of the maximum value of the output signals V'1 to V'5, and outputs this signal V'max to a subsequent stage. The minimum value detecting part 73 detects a signal (referred to as V'min) of the minimum value of the output signals V'1 to V'5 and outputs this signal V'min to a subsequent stage. The averaging part 74 computes an average value of V'1 to V'5 and outputs a signal (referred to as V'ave) of a computed level to a subsequent stage. These maximum value detecting part 72, the minimum value detecting part 73, the averaging part 74, a first comparing part 75, and a second comparing part 76 are equivalent to a signal processing part which generates a detection signal corresponding to the pressure force of the friction pad 32 to the disk 21.

The first comparing part 75 is connected to the subsequent stage of the maximum value detecting part 72 and the minimum value detecting part, and in the first comparing part 75, a deviation between an output from the maximum value detecting part 72 and an output from the minimum value detecting part 73 is calculated and a signal corresponding to the deviation is outputted to a subsequent stage. A subsequent stage side of the first comparing part 75 is connected to a second comparing part 76. The second comparing part 76 compares magnitudes of an output value of the first comparing part 75 and a reference value ΔVa which is set in advance. Then, in correspondence with a result of the above comparison, the second comparing part 76 performs a switching operation of a switch 77. The minimum value detecting part 73 and the averaging part 74 are provided in a previous stage side of the switch 77, and one of outputs from the minimum value detecting part 73 and the averaging part 74 is supplied to a subsequent stage side by the switch 77.

A third comparing part 78 is provided in a subsequent stage of the aforementioned switch 77. Further, to a previous stage of the third comparing part 78, the set signal output part 13 is connected, and a deviation between the output signal V'min from the minimum value detecting part 73 or the output signal V'ave from the averaging part 74 and the set signal V0 from the set signal output part 13 is computed and outputted to a subsequent stage. In a subsequent stage of the third comparing part 78, there is connected an integration circuit 81 which includes an amplifier 79 for example, and a subsequent stage side of the integration circuit 81 is connected to the motor 2. The torque of the motor 2 is controlled by the operation signal Vc outputted from the integration circuit 81. The third comparing part 78, the amplifier 79, and a capacitor 80 are equivalent to a computing part which computes and outputs a set signal of the motor 2.

Subsequently, an operation of the above-described disk brake 11 will be explained. In driving of the automobile 1, when a depressing angle of the brake pedal 12 by a driver becomes large, a set signal V0 outputted from the set signal output part 13 is increased by an amount of an enlarged angle, and an output from the third comparing part 78 to the integration circuit 81 is increased. Then, an operation signal Vc outputted from the integration circuit 81 rises, a torque of the motor 2 rises, the friction pad 31 moves toward the friction pad 32, so that a pressing force to press the disk 21 to the friction pad 32 becomes large.

Then, pressing forces of the respective pressure detecting regions 51a to 55a of the friction pad 32 to the disk 21 become large, and thereby stresses applied to the respective regions 51 to 55 of the crystal piece 40 are also increased. Thereby, pressure detecting signals V1 to V5 outputted from the respective regions 51 to 55 also become large, and amplification signals V'1 to V'5 outputted from the respective amplifiers 71 also become large. Then, the amplification signals V'1 to V'5 are outputted to the maximum value detecting part 72, the minimum value detecting part 73, and the averaging part 74, respectively.

Since the amplification signals V'1 to V'5 are increased, V'max outputted from the maximum value detecting part 72, V'min outputted from the minimum value detecting part 73, and V'ave outputted from the averaging part 74 are increased. The signals V'max, V'min are inputted to the first comparing part 75 and V'max−V'min is computed. This difference signal V'max−V'min is inputted to the second comparing part 76, and the second comparing part 76 compares magnitudes of a reference value ΔVa and V'max−V'min.

Here, in a case of V'max−V'min>ΔVa, the switch 77 changes over so that the averaging part 74 and the third comparing part 78 are connected. Then, in the third comparing part 78, a deviation V0−V'ave between the set signal V0 and V'ave outputted from the averaging part 74 is computed. Since V'ave has become larger as described above, the aforementioned deviation becomes smaller, and thereby an operation signal Vc outputted to the motor 2 is decreased and a rise of the torque of the motor 2 is suppressed. Thus, when the aforementioned deviation becomes "0" (zero), an increase of the operation signal Vc stops and the rise of the torque of the motor 2 stops.

In a case of V'max−V'min≤ΔVa, the switch 77 changes over so that the minimum value detecting part 73 and the third comparing part 78 are connected. Then, in the third comparing part 78, a deviation V0−V'min between the set signal V0 and V'min outputted from the minimum value detecting part 73 is computed. Since V'min has become larger as described above, the aforementioned deviation becomes smaller, and thereby an operation signal Vc outputted to the motor 2 is decreased and a rise of the torque of the motor 2 is suppressed. Thus, when the aforementioned deviation becomes "0" (zero), an increase of the operation signal Vc stops and the rise of the torque of the motor 2 stops.

In driving of the automobile 1, when a depressing angle of the brake pedal 12 by the driver becomes small, a set signal V0 from the set signal output part 13 is decreased by an amount of a decreased angle, and an output from the third comparing part 78 to the integration circuit 81 is decreased. Then, an operation signal Vc outputted from the integration circuit 81 is decreased, a torque of the motor 2 becoming smaller. The friction pad 31 moves toward a direction departing from the friction pad 32, so that a pressing force to press the disk 21 to the friction pad 32 becomes small.

Then, pressing forces of the respective pressure detecting regions 51a to 55a of the friction pad 32 to the disk 21 become smaller, and stresses applied to the respective regions 51 to 55 of the crystal piece 40 are decreased. Thereby, pressure detecting signals V1 to V5 outputted from the respective regions 51 to 55 also become small, and amplification signals V'1 to V'5 outputted from the respective amplifiers 71 also become small. Then, the amplification signals V'1 to V'5 are outputted to the maximum value detecting part 72, the minimum value detecting part 73, and the averaging part 74, respectively.

Since the amplification signals V'1 to V'5 are decreased, V'max outputted from the maximum value detecting part 72, V'min outputted from the minimum value detecting part 73, and V'ave outputted from the averaging part 74 are decreased. The signals V'max, V'min are inputted to the first comparing part 75 and V'max−V'min is computed. This difference signal V'max−V'min is inputted to the second comparing part 76, and the second comparing part 76 compares magnitudes of the reference value ΔVa and V'max−V'min.

Here, in a case of V'max−V'min>ΔVa, the switch 77 changes over so that the averaging part 74 and the third comparing part 78 are connected. Then, in the third comparing part 78, a deviation V0−V'ave between the set signal V0 and V'ave outputted from the averaging part 74 is computed. Since V'ave has become smaller as described above, the aforementioned deviation becomes gradually smaller and a decrease of an operation signal Vc outputted to the motor 2 is suppressed, and thereby a decrease of a torque of the motor 2 is suppressed. Then, when the aforementioned deviation becomes "0" (zero), a decrease of the operation signal Vc stops and a decrease of the torque of the motor 2 stops.

In a case of V'max−V'min≤ΔVa, the switch 77 changes over so that the minimum value detecting part 73 and the third comparing part 78 are connected. Then, in the third comparing part 78, a deviation V0−V'min between the set signal V0 and V'min outputted from the minimum value detecting part 73 is computed. Since V'min has become smaller as described above, the aforementioned deviation becomes smaller, and thereby a decrease of an operation signal Vc outputted to the motor 2 is suppressed and a decrease of the torque of the motor 2 is suppressed. Then, when the aforementioned deviation becomes "0" (zero), a decrease of the operation signal Vc stops and the decrease of the torque of the motor 2 stops.

As described above, in the disk brake 11 provided in the automobile 1, the piezoelectric element 4 is provided in the rear surface of the friction pad 32. With regard to the signals V'1 to V'5 outputted from the respective regions 51 to 55 of the piezoelectric element 4, when a disparity between a maximum value and a minimum value thereof is large, by using an average value of the above V'1 to V'5, control is not influenced by a deviant value even in a state in which pressures in the surface of the piezoelectric element 4 are uneven, so that stable control of the disk brake 11 can be done. When the disparity between the maximum value and the minimum value is small, by using the minimum value, the disk brake 11 can be operated on the safe side, preventing the pressure force of the disk 21 from becoming too small. As stated above, in the disk brake 11, even if the pressures detected in the piezoelectric element 4 vary, the control of the disk brake 11 can be prevented from being influenced thereby. As a result, it is possible to control a deceleration of the disk 21 with high accuracy in correspondence with depressing of the brake pedal 12.

Figure 6:
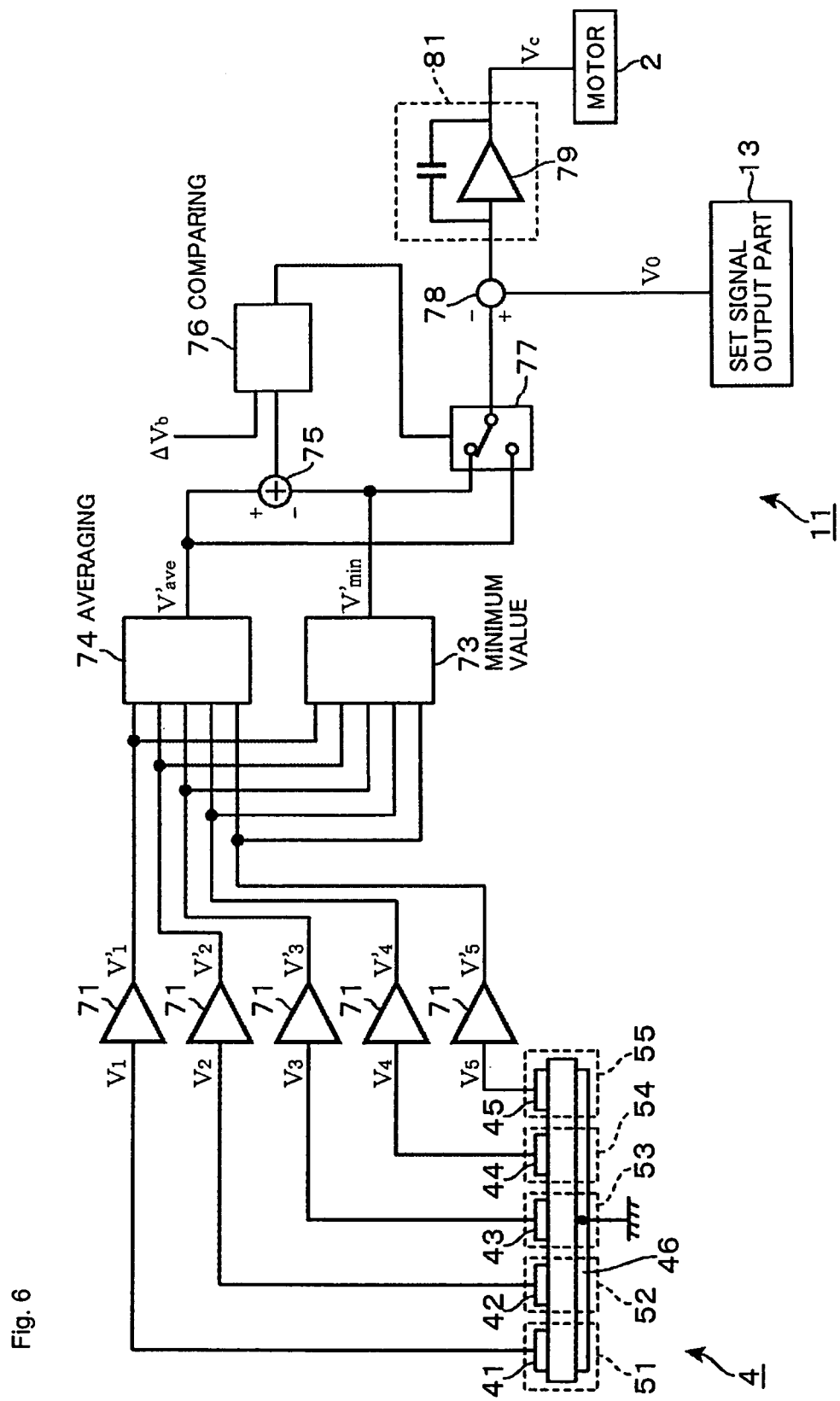
FIG. 6 is a constitutional diagram of a disk brake.

FIG. 6 illustrates another constitutional example of a disk brake 11, and a difference from the constitutional example of the disk brake 11 illustrated in FIG. 5 will be described. A subsequent stage side of an averaging part 74 and a minimum value detecting part 73 is connected to a first comparing part 75, and V'ave−V'min is computed in the first comparing part 75. Then, a second comparing part 76 changes over a switch 77 based on a result of a comparison between magnitudes of a reference value ΔVb which is set in advance and the computed value V'ave−V'min. In a subsequent stage of the minimum value detecting part 73 and the averaging part 74, the aforementioned switch 77 is provided, and the minimum value detecting part 73 or the averaging part 74 is connected to a third comparing part 78.

With regard to an operation of the disk brake 11 of FIG. 6, a difference between the disk brake of FIG. 5 will be described. In a case that V'ave−V'min>ΔVb is judged in the second comparing part 76, the switch 77 changes over so that the averaging part 74 and the third comparing part 78 are connected. Then, a deviation V0−V'ave is computed in the third comparing part 78, and a signal corresponding to a computed value thereof is integrated in an integration circuit 81 and outputted to a motor 2.

In a case that V'ave−V'min≤ΔVb is judged in the second comparing part 76, the switch 77 changes over so that the minimum value detecting part 73 and the third comparing part 78 are connected. Then, a deviation V0−V'min is computed in the third comparing part 78, and a signal corresponding to a computed value thereof is integrated in the integration circuit 81 and outputted to the motor 2.

As described above, in the constitutional example of FIG. 6, with regard to signals V'1 to V'5 outputted from the respective regions 51 to 55 of a piezoelectric element 4, when a disparity between an average value and a minimum value thereof is large, the deviation with the set signal V0 is computed by using an average value of V'1 to V'5 above, and when the disparity between the average value and the minimum value thereof is small, the minimum value of V'1 to V'5 above is used. Such a constitution can also brings about an effect similar to that of the disk brake 11 of FIG. 5. Further, there is an advantage that a maximum value detecting part 72 is not necessarily required to be provided.

The piezoelectric element 4 of the above-described embodiment has electrodes formed in a common crystal piece 40, being constituted to function as five piezoelectric elements in practice, but it is possible to constitute that a crystal piece is divided into individual pieces to be separate piezoelectric elements respectively. However, by providing the plural electrodes in the common crystal piece 40 as in the above-described embodiment, it is possible to prevent signals outputted from the respective electrodes of the crystal piece from varying due to a variation of properties such as a temperature property each crystal piece has. Therefore, a deceleration of a disk 21 can be controlled with higher accuracy.

Figure 3:
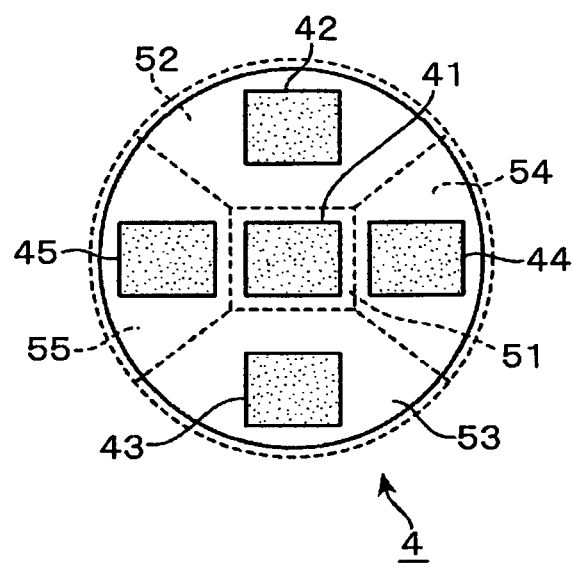
FIG. 3(*a*) and FIG. 3(*b*) are plan views of a pressure sensor.
Figure 3:
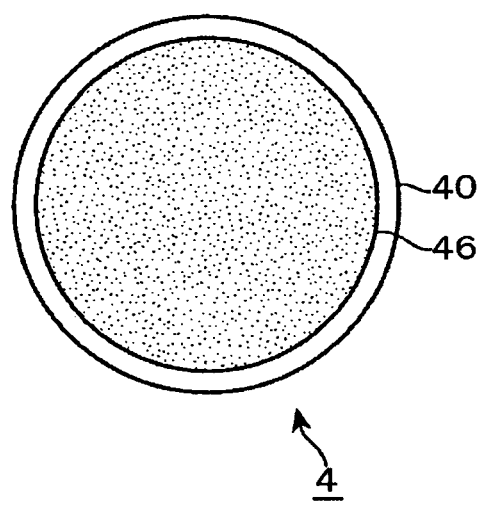

A shape of the crystal piece 40 can be any shape, and the crystal piece 40 can have any shape such as a square, a rectangle, or a rhombus, other than the circular shape illustrated in FIG. 3. Further, a shape of each electrode formed in the crystal piece is not limited to a rectangle illustrated in FIG. 3, and can be any shape. For example, the shape can be a square, a rectangle, a rhombus, a circle, a fan shape, or the like.

The piezoelectric element 4 can be provided in a rear surface (opposite surface to a pressing surface 35) of a friction pad 31 and can be buried in friction pads 31, 32. Further, it can be constituted that the friction pads 31, 32 presses the disk 21 from both sides.

An application example of a disk brake 11 to be a brake mechanism to an automobile being a transport apparatus has been described, but the disk brake 11 can be applied to other transport apparatuses. For example, by applying the disk brake 11 to a train to constitute that a wheel of the train instead of the above-described tire is interlocked to rotate with a disk 21, control of the aforementioned wheel can be performed with high accuracy. Further, by applying the disk brake 11 to a wheel of an airplane, control of the aforementioned wheel can be performed with high accuracy similarly to a case of the train. Further, the disk brake 11 can be applied to a screw of a ship or a propeller of an airplane, other than the wheel. In other words, it can be constituted that the disk 21 is interlocked to rotate with the propeller or the screw thereby to control a rotation of the propeller or the screw by the disk brake 11 with high accuracy. As described above, a scope of the present invention includes transport apparatuses such as an automobile, a ship, and an airplane to which the disk brake 11 is applied.

Figure 7:
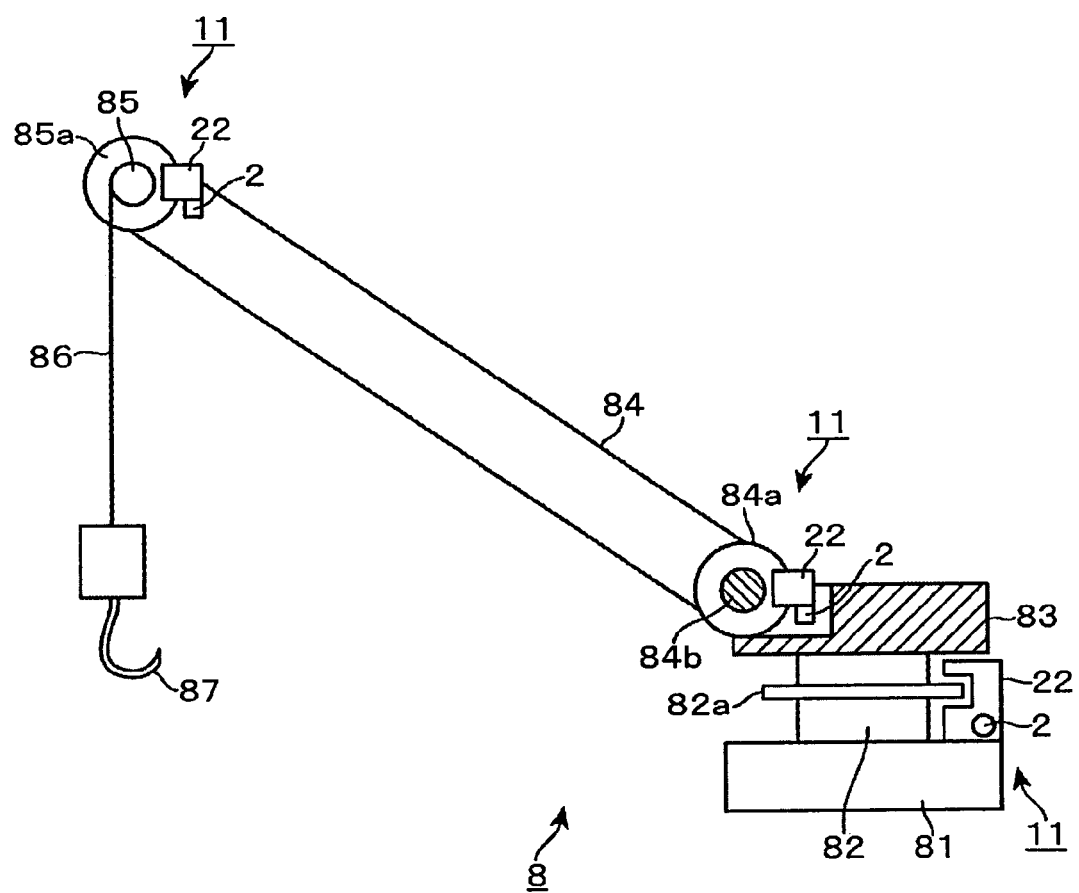
FIG. 7 is a side view of a crane to which the disk brake is applied.
Figure 8:
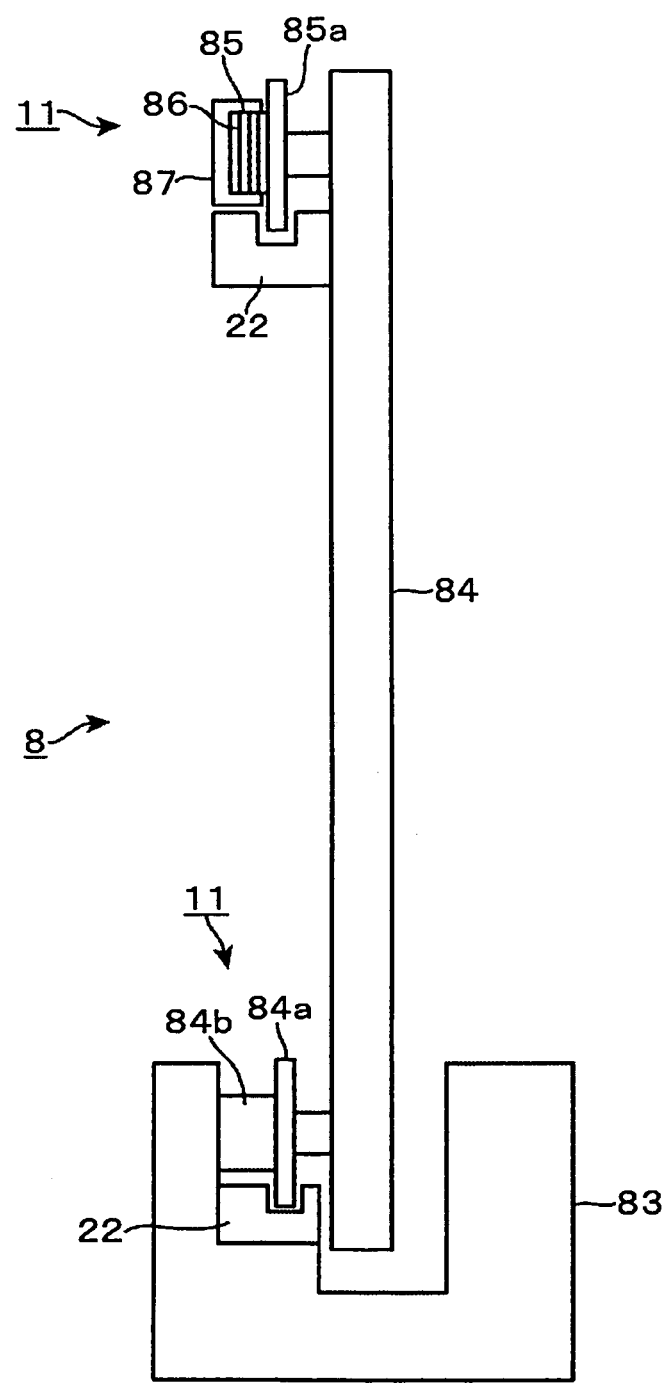
FIG. 8 is a plan view of the crane.

A variety of industrial apparatuses to which the present invention is applied other than the above will be described. FIG. 7 is a side view of a crane 8 being a construction apparatus, and FIG. 8 is a plan view thereof. A reference number 81 in the drawing indicates a base, a reference number 82 in the drawing indicates a support post which rotates around a vertical axis in relation to the base 81 by a not-shown motor, and a reference number 83 in the drawing indicates a rotary table fixed to the support post 82. A reference number 84 in the drawing indicates an arm extending upwards from the rotary table 83, which is adjustable in an arbitrary angle in relation to a horizontal surface by a motor 84b provided in the rotary table 83.

A reference number 85 indicates a pulley provided in a tip side of the arm 84, and is pivoted around a horizontal axis by a not-shown motor provided in the arm 84. One end of a wire 86 is fixed to the pulley 85, and a hook 87 for material conveyance is connected to the other end of the wire 86. The aforementioned motor makes the wire taken up by the pulley 85 or suspended, and thereby the hook 87 is constituted to be able to be raised/lowered. The pulley 85, the arm 84, and the support post 82 are respectively provided with flanges 85*a*, 84*a*, 82*a* to rotate with those members. The flanges 85*a*, 84*a*, 82*a* are equivalent to the disk 21 of the embodiment already described. Respective calipers 22 are provided in correspondence with the flanges 85*a*, 84*a*, 82*a*.

For example, when a user operates an operation lever equivalent to the brake pedal 12, the calipers 22 suppress rotation speeds of the respective flanges 85*a*, 84*a*, 82*a* independently similarly to in the embodiment already described, and it is possible to control a speed of changing a direction of the rotation table 83, a speed of changing an angle of the arm 84 and a speed of raising/lowering the hook 87 with high accuracy. Thereby, the aforementioned material conveyance becomes easy, promoting an efficiency of an operation. Meanwhile, in this example, it can be constituted that a table or a boxed-shaped body which conveys a person or a material can be raised/lowered instead of the hook 87, constituted as an elevator apparatus. In addition to the above, the brake mechanism of the present invention can be applied to a folk lift, for example, thereby to control a speed of raising/lowering a folk with high accuracy.

Figure 9:
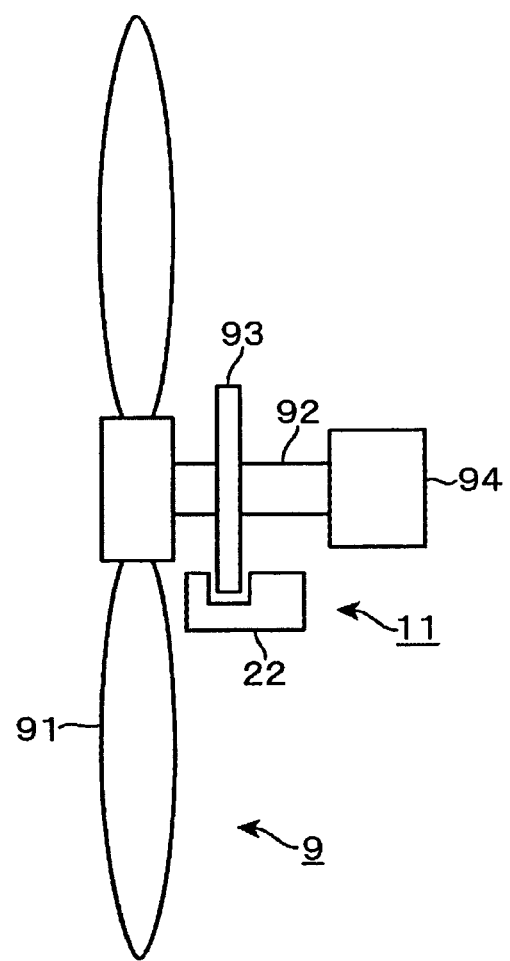
FIG. 9 is a side view of a windmill to which the disk brake is applied.

FIG. 9 illustrates a wind power generation apparatus 9 which includes a brake mechanism of the present invention, as an industrial apparatus. A reference number 91 in the drawing indicates a windmill, a reference number 92 in the drawing indicates a supporting part connected to the windmill. A reference number 93 in the drawing indicates a flange provided in the supporting part, and is equivalent to a disk 21. A reference number 94 in the drawing indicates a power generation part which generates electricity in correspondence with a rotation speed of the supporting part 92. For example, a caliper 22 is operated by an operation lever equivalent to the brake pedal 12, whereby a rotation of the windmill 91 can be decelerated. Thereby, if a wind force is too strong for example, a damage of the wind power generation apparatus 9 can be suppressed and a proper power generation amount can be obtained. As described above, the present invention can be applied to a variety of industrial apparatuses which use a brake mechanism to control a rotation speed of a disk by pressing the disk, and the industrial apparatus to which the brake mechanism of the present invention is applied is also included in a scope of the present invention.

What is claimed is:

1. A brake mechanism comprising:
  a disk which rotates;
  a first pad provided at one surface side of said disk in a manner to face said disk;
  a second pad provided at the other surface side of said disk in a manner to face said first pad across said disk;
  an electromotive actuator which suppresses a rotation of said disk by moving said first pad toward said second pad to sandwich and press said disk between said first pad and said second pad;
  a pressing force setting section outputting a set signal that sets a positive pressing force of said pad to said disk;
  a plurality of piezoelectric elements provided at different places from each other at said first pad or said second pad, the plurality of piezoelectric elements detecting a stress of said pad;
  a signal processing part which processes electric signals obtained from said plurality of piezoelectric elements and generates a detection signal of the pressing force, the detection signal corresponding to the pressing force of said pad to said disk; and
  a computing part which obtains a deviation between the set signal and the detection signal, computes an operation signal of said electromotive actuator based on the deviation, and then outputs the operation signal; and
  wherein said signal processing part creates the detection signal based on a maximum value and a minimum value of the electric signals obtained from the plurality of piezoelectric elements;
  wherein the signal processing part calculates a difference of the maximum value and the minimum value;
  wherein when a difference of the maximum value and the minimum value is larger than a standard value set up beforehand, the signal processing part outputs an average value of the obtained electric signals as the detection signal to the computing part; and
  wherein when a difference of the maximum value and the minimum value is equal to the standard value or below the standard value, the signal processing part outputs the minimum value as the detection signal to the computing part.

2. The brake mechanism according to claim 1, wherein the plurality of piezoelectric elements consist of one piezoelectric piece which is shared by the piezoelectric elements and a plurality of electrodes on the piezoelectric piece that take out each output of the plurality of piezoelectric elements.

3. The brake mechanism according to claim 1, wherein each one of said plurality of piezoelectric elements is constituted by an individual crystal piece.

4. The brake mechanism according to claim 1, wherein said electromotive actuator comprises a motor and a converting member to convert a torque of said motor into a linear movement for moving said first pad, and wherein the operation signal is outputted to said motor.

5. The brake mechanism according to claim 1, wherein said disk is interlocked to rotate with a wheel of a running vehicle.

6. A transport apparatus which has the brake mechanism according to claim 1.

7. An industrial apparatus which has the brake mechanism according to claim 1.

8. A brake mechanism comprising:
  a disk which rotates;
  a first pad provided at one surface side of said disk in a manner to face said disk;
  a second pad provided at the other surface side of said disk in a manner to face said first pad across said disk;
  an electromotive actuator which suppresses a rotation of said disk by moving said first pad toward said second pad to sandwich and press said disk between said first pad and said second pad;
  a pressing force setting section outputting a set signal that sets a positive pressing force of said pad to said disk;
  a plurality of piezoelectric elements provided at different places from each other at said first pad or said second pad, the plurality of piezoelectric elements detecting a stress of said pad;
  a signal processing part which processes electric signals obtained from said plurality of piezoelectric elements and generates a detection signal of the pressing force, the detection signal corresponding to the pressing force of said pad to said disk; and
  a computing part which obtains a deviation between the set signal and the detection signal, computes an operation signal of said electromotive actuator based on the deviation, and then outputs the operation signal; and
  wherein said signal processing part creates the detection signal based on a minimum value and an average value of the electric signals obtained from the plurality of piezoelectric elements;

wherein the signal processing part calculate a difference of the average value and the minimum value;

wherein when a difference of the average value and the minimum value is larger than a standard value set up beforehand, the signal processing part outputs the average value as the detection signal to the computing part; and wherein when a difference of the average value and the minimum value is equal to the standard value or below the standard value, the signal processing part outputs the minimum value as the detection signal to the computing part.

9. The brake mechanism according to claim 8, wherein the plurality of piezoelectric elements consist of one piezoelectric piece which is shared by the piezoelectric elements and a plurality of electrodes on the piezoelectric piece that take out each output of the plurality of piezoelectric elements.

10. The brake mechanism according to claim 8, wherein each one of said plurality of piezoelectric elements is constituted by an individual crystal piece.

11. The brake mechanism according to claim 8, wherein said electromotive actuator comprises a motor and a converting member to convert a torque of said motor into a linear movement for moving said first pad, and wherein the operation signal is outputted to said motor.

12. The brake mechanism according to claim 8, wherein said disk is interlocked to rotate with a wheel of a running vehicle.

13. A transport apparatus which has the brake mechanism according to claim 8.

14. An industrial apparatus which has the brake mechanism according to claim 8.

15. The brake mechanism according to claim 8, wherein the plurality of piezoelectric elements are formed by a single, common piezoelectric piece, with each one of the plurality of piezoelectric elements corresponding to a different region of the piezoelectric piece, and wherein for each one of the plurality of piezoelectric elements an electrode is situated on the piezoelectric piece so that there are a plurality of electrodes on the piezoelectric piece that provide output of said electric signals obtained from said plurality of piezoelectric elements.

* * * * *